United States Patent [19]
Ritzling

[11] 4,316,317
[45] Feb. 23, 1982

[54] METHOD AND APPARATUS FOR ADJUSTING ROLLER RINGS ON A SHAFT

[75] Inventor: Bertil Ritzling, Huddinge, Sweden

[73] Assignee: Forenade Fabriksverken, Eskilstuna, Sweden

[21] Appl. No.: 130,057

[22] Filed: Mar. 13, 1980

[30] Foreign Application Priority Data

Mar. 22, 1979 [SE] Sweden ............................... 7902591

[51] Int. Cl.[3] ....................... B23Q 17/16; B27G 23/00

[52] U.S. Cl. ......................................... 29/468; 83/499; 83/504; 33/185 R; 493/367

[58] Field of Search ............... 29/468, 282; 33/185 R; 83/483, 660, 846, 345, 499, 504; 493/366, 7

[56] References Cited

U.S. PATENT DOCUMENTS 4,080,708 3/1978 Decombe et al. ................ 29/468 X
4,224,847 9/1980 Tokuno ............................ 83/499 X

*Primary Examiner*—Milton S. Mehr

*Attorney, Agent, or Firm*—McCormick, Paulding & Huber

[57] ABSTRACT

Method and apparatus for adjusting roller rings (5) on a roller (4) in exact positions in the peripheral and the axial directions in relation to each other and in relation to the roller (4), and in which the apparatus comprises a parallelogram means (11) which is movable parallelly to the rotatable roller (4) and which comprises an adjustment head (14) having a guide pin (18) adapted to co-operate with the corresponding guide bore (17) in each roller ring, and in which the parallelogram means (11) is supported by a support body (15) which is fixed mounted in relation to the rotatable roller (4) and which comprises both a drive mechanism (14) for positively moving the parallelogram means (11) and a locking means (19) for locking the parallelogram means in an adjusted position and a gauge apparatus (16) for exactly gauging the movements of the parallelogram means (11).

10 Claims, 6 Drawing Figures

METHOD AND APPARATUS FOR ADJUSTING ROLLER RINGS ON A SHAFT

The present invention relates to a method and an apparatus for adjusting roller rings on a rotatable shaft in exactly predetermined position in relation to the shaft and in relation to each other. More particularly the invention relates to such adjustment apparatus which can be mounted on a machine of the type comprising one or more rotatable shafts carrying one or more roller rings which must be located in very accurately predetermined positions.

The invention has been brought to mind especially in connection to perforating machines of the type comprising roller rings which are adapted to be mounted in optional positions on a rotatable shaft and which are formed with pins, projecting portions etc. which co-operate with a milling tool and in which a web of material, for instance a paper web is fed between the roller rings and the milling tool, whereby the paper web is perforated corresponding to the projecting portions of the roller rings. It is, however, to be understood that the invention is not limited to the said field of use, but the invention may be applied to a great many other types of machines.

However, for the sake of simplicity the invention will be explained in the following with reference to a perforating machine of the above mentioned type.

In many cases pre-printed and perforated paper products are manufactured as continuous webs, whereby the perforations may be guiding holes, so called formaline holes, attachment holes, cross-perforations and other types of perforations. As examples of such material may be mentioned chain forms, computer machine forms etc. It is often of greatest importance that the perforations are provided in a very accurately predetermined position on the web of material, and it is thereby of greatest importance that the perforations, for instance the guide holes, of parallel rolls of guide holes are positioned exactly parallelly to each other and on exactly mutual distances from each other and on exact distances from the edges of the paper webs etc. The roller rings co-operating with the milling tools are separate units which can be mounted in optional positions axially and peripherally on the shaft.

Previously the positions of the said roller rings used to be adjusted in a fully manual way and by successive test runs and subsequent adjustments. This is a very time consuming work and often gives an unsatisfactory result.

The invention is intended to solve the said problems and to provide an apparatus for quick and very accurate adjustment of the roller rings, which apparatus may be provided as an accessory apparatus which can be mounted on available machines or which can be mounted integrally in new made machines.

Further characteristics of the invention will be evident from the following detailed specification in which reference will be made to the accompanying drawings.

It is, however, to be understood that the embodiments of the invention illustrated in the drawings are only illuminating examples and that all kinds of modifications may be presented within the scope of the appended claims.

In the drawings

FIG. 1, diagrammatically shows a side view of an apparatus according to the invention and FIG. 2 shows a cross-section mainly along line II—II of FIG. 1.

Figure 1:
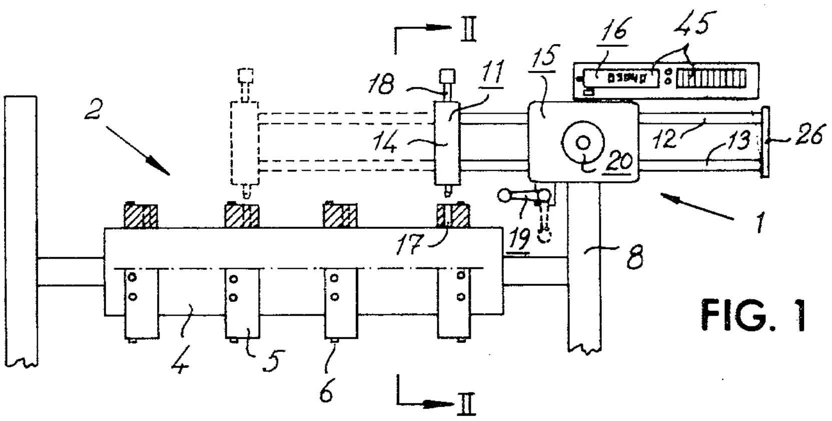
Figure 2:
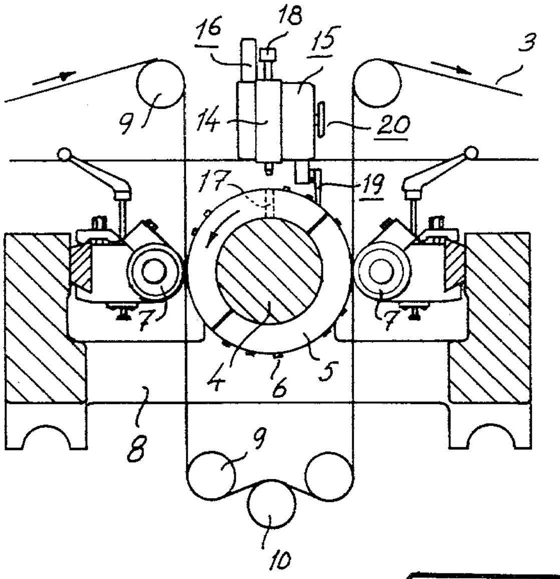
Figure 5:
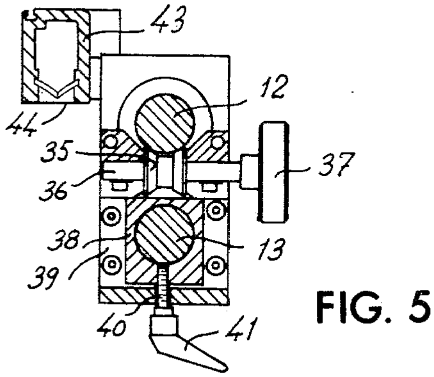
FIG. 5 is a cross-section along line V—V of FIG. 3.
Figure 6:
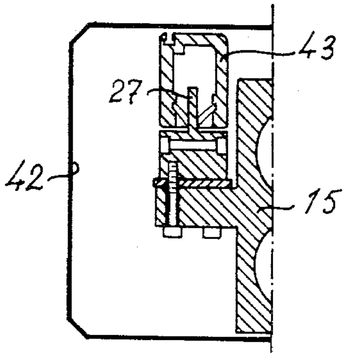
FIG. 6 is a corresponding fragmentary view along line VI—VI of FIG. 5.

With reference to FIGS. 1 and 2 there is illustrated an apparatus 1 according to the invention which can be mounted on a machine 2 for perforating a web of material 3, for instance a paper web. The perforating machine 2 comprises one or more rotatable rollers 4 one of which is illustrated and which carries four roller rings 5. Preferably each roller ring is formed as two semi-cylinder rings which are provided with a number of raised portions in the form of pins 6 of steel. The said pins 6 provide upper-dies or patrixes for the perforations to be made. The upper dies 6 co-operate with milling tools 7 which are mounted in the machine support 8 adjustable to an exact predetermined position in relation to the roller rings, so that a hole corresponding to the upper-dies 6 are milled by the milling tools in the paper web 3 which is fed between the roller rings 5 and the milling tools 7. For keeping the paper web in an exact position and for keeping the web stretched the machine comprises in the conventional way pulleys 9 and stretch rollers 10.

The adjustment apparatus according to the invention which is mounted on the machine support 8 comprises a parallelogram means 11 having guide shafts 12, 13 and at one end of the said shafts an adjustment head 14 a support body 15 and a gauge apparatus 16 connected to the said support body 15. The support body 15 provides the supporting part of the apparatus and it is stably mounted on the machine support 8 so that the parallelogram means 11 extends exactly parallelly to the roller 4 both in the horizontal and the vertical direction. The parallelogram means 11 is guided in the support body 15 so that it can be moved over the entire length of the roller 4 while maintaining an exact predetermined position in relation to the roller 4.

For adjusting the roller rings 5 each ring is formed with a guide bore 17 and for co-operation with the said guide bores the adjustment head 14 has a guide pin 18 which can drop down in the guide bores 17 when adjusting the roller rings. The support body 15 preferably comprises a locking means 19 by means the parallelogram can be locked in a predetermined position so that each roller ring 5 can be positioned in relation to the guide pin 18 thereby taking its exactly predetermined position. The gauge device 16 comprises an accurate gauge scale which preferably can be zero-positioned or it may comprise two gauge scales in which one scale gives the total length of the movement of the parallelogram and the second scale gives a relative displacement between the different adjusting positions. The gauge apparatus 16 can be mechanical or electronical and is of a previously known type. The support body 15 comprises a drive mechanism 20 for moving the parallelogram means 11 and the said drive mechanism can be a rack and cog wheel coupling or a friction coupling between a drive roller and one of the guide shafts 12 or 13.

In FIGS. 3–6 a preferred embodiment of the apparatus according to the invention is shown more in detail. The figures illustrate how the guide shafts 12 and 13 are movable mounted in the support body 15 in two spaced bearings 21, 22 which bearings in turn are mounted in brackets 23 and 24. At their rear ends the guide shafts 12 and 13 are connected to each other by means of an end bracket 26 providing together with the adjustment head 14 ends of the parallelogram means 11. The end bracket 26 and the adjustment head 14 also provides a holder for a gauge scale which moves together with the guide shafts 12 and 13 and which co-operates with a fixed means 27 of the support body 15. (See FIG. 6).

Figure 3:
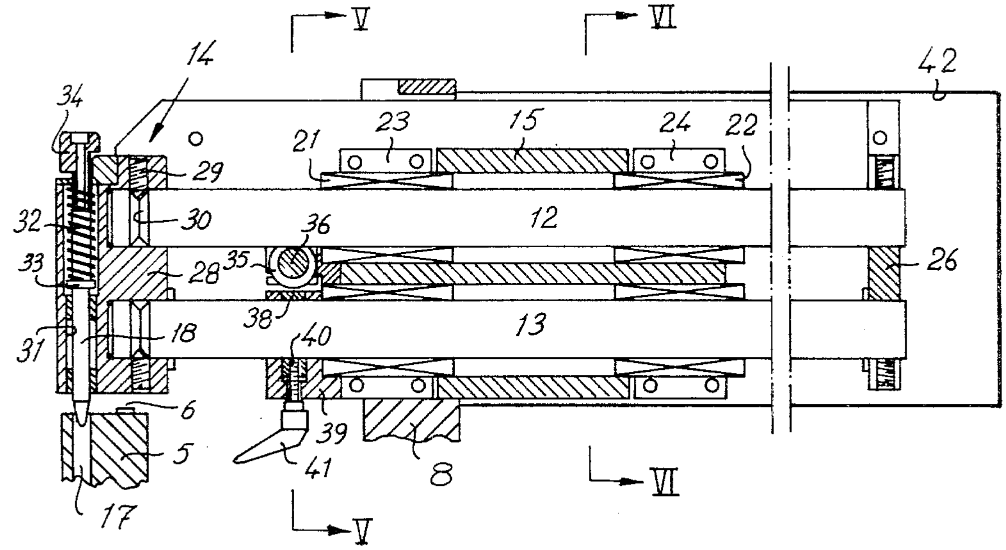
FIG. 3 is a vertical cross-section in the longitudinal direction through a preferred embodiment of an apparatus according to the invention and FIG. 4 is a diagrammatical top view of the apparatus of FIG. 3.

As best evident from FIG. 3 the adjustment head 14 comprises an adjustment housing 28 in which the guide shafts 12 and 13 are fixed mounted by means of screws 29 engaging W-grooves 30 of the guide shafts. The housing 28 as a vertical guide bore 31 for the guide pin 18 which is biassed in the direction downwards by a spring 32. A collar 33 on the guide pin 18 provides both a support for the spring 32 and a stop means for the movement downwards of the guide pin in that the collar 33 co-operates with a shoulder in the guide bore 31. The guide pin 18 is formed with a knob 34 for pulling the guide pin out of the adjustment bore 17 of the roller ring 5.

For moving the parallelogram means 11 there is a drive mechanism comprising a diabolo formed drive roller 35 mounted on a shaft 36 which is in turn mounted in the support body 15. The shaft 36 extends out of the support body and has a wheel 37 at the outer end. The drive roller 35 is kept pressed onto the upper guide shaft 12 thereby providing a friction engagement therewith so that the parallelogram upon rotation of the wheel 37 is moved in relation to a support 25 of the apparatus.

For locking of the parallelogram in a wanted position there is a locking ring 38 which is mounted in a carrier 39. The carrier 39 is fixed connected to the support body 15 and by means of a screw 40 threaded into the locking ring 38 and a locking handle 41 at the outer end of the screw the said locking ring 38 can be pressed against the guide shaft 30 thereby locking the ring 38 against the support body 15. As mentioned above the gauge apparatus comprises a gauge scale 43 which is movable together with the parallelogram and which co-operates with a fixed means 27 in the support body 15. The gauge scale is preferably dust protected by means of a recilient dust cover 44. The relative movement between the gauge scale 43 and the fixed means 27 can be transmitted in any mechanical or electronical way to a gauge panel 45 for indicating the movements of the parallelogram.

Figure 4:
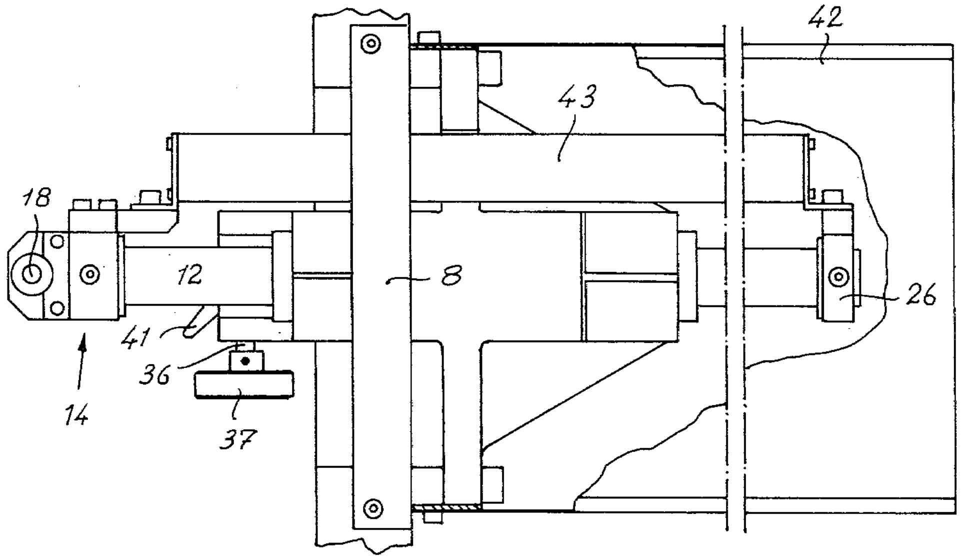

The entire adjustment apparatus can be mounted for instance the machine support by means of the support body 15 as illustrated in FIGS. 3 and 4 or in any other suitable way so that the apparatus gets very stably mounted in the machine.

The utilizing of the apparatus for adjusting two or several roller rings 5 on a rotatable roller 4 is made as follows:

The roller rings 5 are loosely provided on the roller 4 and the parallelogram 11 is moved to a position exactly corresponding to the wanted position for one outer edge of the paper web 3. The first roller ring 5 is moved to a position underneath the guide pin 1, and the said guide pin 18 is let down onto the perephery of the roller ring and is allowed to be biassed thereon by the action of the spring 32. The roller ring 5 is rotated and is moved axially respectively by a manual operation until the guide hole 17 of the roller ring comes into position in alignment with the guide pin 18 whereby the guide pin drops down in the guide bore 17. After having checked on the gauge panel 45 that the position of the first roller ring is the exactly wanted position the roller ring 5 is clamped to the roller 4, the guide pin 18 is pulled out of the guide bore of the roller ring and the parallelogram is moved to a position exactly corresponding to the wanted distance between the rows of perforation holes of the paper web 3. The said distance can be read on the gauge panel 45, and in order to facilitate the reading thereof the gauge panel may preferably be provided so as to become zero-adjusted for the position of the first roller ring. Alternatively two gauge scales may be provided, one of which can be zero-adjusted whereas the second scale indicates the total movement of the parallelogram.

After the adjustment head 14 has been moved to the exactly intended second position the locking handle 41 is pulled so that the adjustment head is locked in the said position. Thereafter a second roller ring 5 is rotated and is moved axially respectively like the first roller ring as explained above until the guide pin 18 drops down into the guide hole of the second roller ring. Also the second roller ring is clamped in this position, and in corresponding way any number of rolling rings can quickly and easily be mounted in exactly wanted positions on the rotatable roller 4.

Since the parallelogram means 11 is mounted and guided exactly parallelly to the roller ring 4, and since the perforating pins or patrixes 6 of the roller ring 5 are mounted very accurately in relation to the guide hole 17 of the roller ring 5, consequently the roller rings are located very accurately in relation to each other both in the axial and in the peripheral direction of the roller. If for some reason there should be a wish to adjust the position of any of the roller ring this can quickly and with great accuracy be made by means of the adjustment apparatus according to the invention.

I claim:

1. Method for locating and adjusting of roller rings (5) on a roller (4) in exactly predetermined positions in relation to each other and in relation to the roller (4) by means of a guide pin (18) provided displacable exactly parallelly to the axis of the roller (4) and corresponding guide bores (17) in the roller rings (5), characterized in locating the guide pin (18) in an exactly predetermined position over the rotatable roller (4) and preferably locking the guide pin (18) in this position whereupon a first roller ring is rotated and moved axially respectively on the roller (4) until the guide bore (17) of the roller ring is in a position in alignment with the guide pin, moving the guide pin down into the guide bore (17) of the roller ring (5) for maintaining the roller ring in the actual position, thereafter securing the roller ring (5) on the roller (4), removing the guide pin (18) from the guide bore (17) of the first roller ring, moving the guide pin (18) an exactly predetermined distance to a second position and locking same in said position, rotating a second roller ring (5) and displacing same axially on the roller (4) correspondingly until the guide bore (17) of the second roller ring is in position in alignment with the guide pin (18), moving the guide pin (18) down into the guide bore (17) and securing the second guide ring (5) on the roller (4) and in a corresponding way positioning and adjusting any wanted number of roller rings (5) on the roller (4).

2. Apparatus for mounting of roller rings (5) in exactly predetermined positions on a rotatable roller (4), characterized in that the apparatus comprises an adjustment mechanism which includes an adjustment head (14) supported for movement parallel to the axis of the rotatable roller (4), a guide pin (18) carried by the adjustment head (14), means for positioning said guide pin to cooperate with a corresponding guide bore (17) of the roller ring to keep the roller ring in an exactly predetermined position while the roller ring (5) is secured on the roller (4), and means (19) for locking the adjustment head (14) in the exactly adjusted position in relation to the rotatable roller (4).

3. Apparatus according to claim 2, characterized in that the adjustment mechanism includes parallelogram means (11) for supporting the adjustment head, and drive means (20) for moving said parallelogram means relative to the rotatable roller (4).

4. Apparatus according to claim 2 or 3, further characterized in that said apparatus includes biasing means (32) for urging the guide pin (18) toward the roller (4) to resiliently contact the periphery of the roller ring (5) while the roller ring (5) is rotated and moved until the guide pin (18) engages the guide bore (17) of the roller ring (5).

5. Apparatus according to claim 2 characterized in that the adjustment mechanism includes a drive means (20) for positively moving the adjustment head (14) in one plane.

6. Apparatus according to claim 3 characterized in that the parallelogram means (11) comprises two guide shafts (12, 13) which carry the adjustment head (14) and in that the drive means (20) comprises a drive roller (35) which co-operates with one (12) of the two guide shafts (12, 13), and an adjustment wheel (37) for rotating the drive roller (35).

7. Apparatus according to claim 2 or claim 3, characterized in that the locking means (19) comprises a locking ring (38) restrained against movement in the direction of movement of the parallelogram means and movable in a direction perpendicularly to the direction of movement of the parallelogram means and means for moving the locking ring (38) into pressing engagement with a part (13) of the parallelogram means to lock the parallelogram means against movement.

8. Apparatus according to either claim 2 or claim 3, characterized by a gauge apparatus (16) which cooperates with the adjustment head (14) to exactly indicate the movements of the adjustment head (14).

9. Apparatus according to claim 3, characterized by gauge apparatus (16) which includes a gauge scale (43) mounted on the parallelogram means for movement together therewith and which co-operates with a fixed means (27) whereby the relative movements between the gauge scale (43) and the fixed means (27) is transmitted to a gauge panel (45) which exactly indicates the movements of the adjustment head (14).

10. Apparatus for mounting of roller rings (5) in exactly predetermined positions on a rotatable roller (4), characterized in that the apparatus comprises an adjustment mechanism which includes an adjustment head (14), means supporting the adjustment head for movement parallel to the axis of the rotatable roller (4), means carried by the adjustment head (14) for cooperating with means on the roller ring (5) to retain the roller ring in a precise predetermined position on the roller (4), and means (19) for locking the adjustment head (14) in a precisely adjusted position relative to the roller (4).

* * * * *